Aug. 4, 1959  C. MAJER  2,897,731
METHOD AND MACHINE FOR MAKING PAPER TUBES
Filed Sept. 22, 1953  2 Sheets-Sheet 1
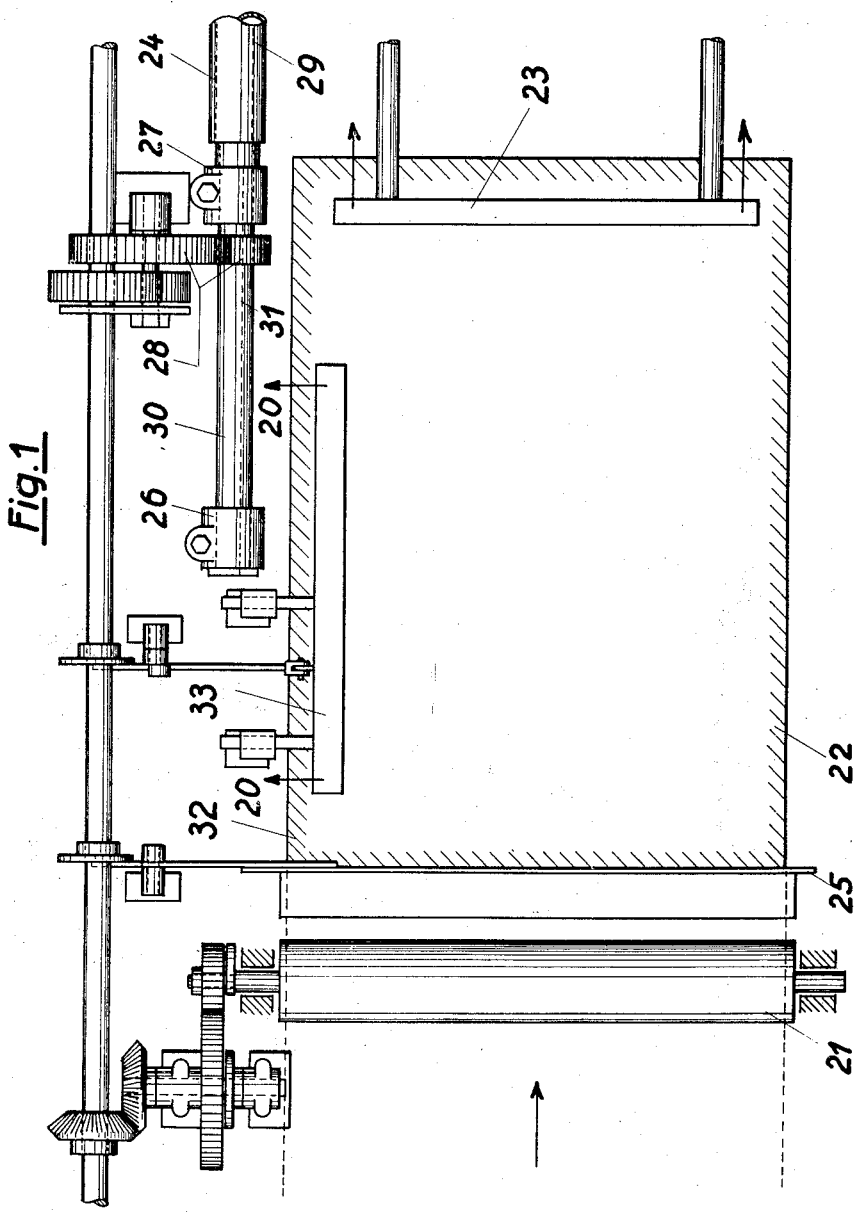
INVENTOR
Christian Majer
BY  Michael S Striker
ATTORNEY Aug. 4, 1959
C. MAJER
2,897,731
METHOD AND MACHINE FOR MAKING PAPER TUBES
Filed Sept. 22, 1953
2 Sheets-Sheet 2
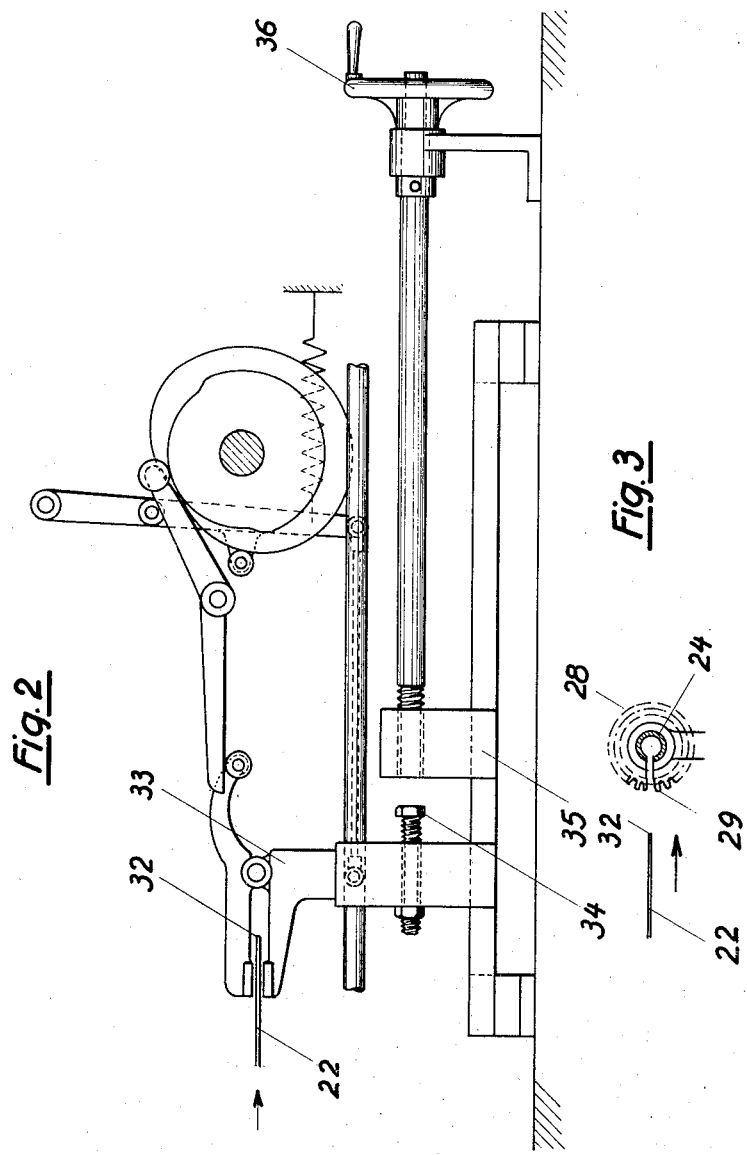
INVENTOR
Christian Majer
BY
Michael S. Striker
ATTORNEY

United States Patent Office 2,897,731
Patented Aug. 4, 1959

2,897,731

METHOD AND MACHINE FOR MAKING PAPER TUBES

Christian Majer, Tubingen, Wurttemberg, Germany

Application September 22, 1953, Serial No. 381,565

Claims priority, application Germany September 22, 1952

8 Claims. (Cl. 93—79)

The present invention relates to a method and a machine for producing paper or cardboard tubes, especially for use in the textile industry.

For inserting the segments into the spindles, each segment, with the edge facing in the direction of movement was previously moved up to the spindle bearing, so that, when further advanced in the feeding direction, it passed into the usual somewhat wider or deeper inserting slots of the spindle bearings which lie in line with the narrower holding slot of the spindle, and after passing through the inserting slots, entered into the spindle holding slot. In this operation it was impossible to insert the segment into the slots as long as they were rotating for winding the preceding tube so that the path traveled from the end of the spindle bearings which is closest to the front edge of the paper web to the beginning of the spindle slot was a purely idle run causing a considerable loss of valuable time, since, for the unilateral support of the spindle, two spindle bearings were provided which must be spaced apart as much as possible resulting in a rather long idling distance.

Efforts have been made in the prior art to overcome this disadvantage by moving the two spindle bearings as closely together as possible. This, however, resulted in a poor bearing support of the spindle, crooked unwinding of the paper sheet, and thus causing uneven tubes and a considerable waste of material.

This disadvantage in the prior method also applies to the insertion of the blank in single or multiple spindle machines in which the paper web is from the very beginning fed to, and inserted in, the winding spindles parallel thereto.

It is an object of the invention to overcome these disadvantages of the prior are by feeding the segment at a radial distance from the spindle bearings until its front edge at least reaches the beginning of the winding spindle, and by then moving it into the winding position relative to the spindle by a transverse movement which, if desired, may be followed by a further feeding movement in axial direction. This method has the advantage that the feeding is made independent of the position of the spindle bearings, which can thus be placed further apart so that the support of the spindles is improved and absolutely uniform tubes can be obtained. Also, the short transverse movement, as compared with the long axial movement which was previously required, results in a considerable increase in the efficiency and the output of the machine. Such transverse movement may be effected either by mechanical means or by suction.

If the paper web is fed vertically the turned individual segments are, after the separation, first moved transversally to such a suitable distance from the spindles that the segments are free from the spindle bearings when moved in axial direction, and are only then moved parallel to the spindles. In this case the spindles may be placed closer together by the entire width of the bearing than was possible with the former method of insertion.

A characteristic feature of the machine for carrying out this inventive method therefore consists in such arrangement of the feeding mechanism for the paper web that it feeds the paper web axially to the winding spindle at a certain radial distance from the spindle bearings, and in the provision of mechanical or pneumatic means for effecting a transverse movement of the paper web in the direction of the insertion into the bearing or spindle slots.

Further objects, features, and advantages of the present invention will be apparent from the following description and the appended drawings of one embodiment thereof, wherein—

Fig. 1 is a diagrammatic top view of the arrangement of the respective parts of a winding machine for producing conical tubes;

Fig. 2 diagrammatically shows a transverse gripper according to the invention; and Fig. 3 shows a cross section through the winding spindle.

The method of feeding the segments to the spindles is generally applicable to winding machines in which the paper web is fed in a direction parallel to the spindles and this feature of the invention is, for the sake of a better understanding, illustrated in Figs. 1 and 2 on a single spindle winding machine.

In Fig. 1, a pair of superimposed feed rollers 21, only one of which is shown, feeds the paper web 22 from a roll of paper to the winding spindle 24 in a direction parallel to the longitudinal axis thereof. The strip of paper required for each tube is cut off by the knife 25.

The winding spindle 24 which is rotated by a driving wheel 28, is unilaterally supported in the usual manner at the entering side of the paper web by means of two spindle bearings 26 and 27 mounted in spaced relation from each other. The spindle 24 has the usual holding slot 29 which is continued in the form of slightly wider or deeper inserting slots 31 in the spindle bearings 26 and 27, the bearing stud 30, and the driving wheel 28 thereon.

As shown in Fig. 1, the paper web, according to the invention, is fed at a suitable small radial distance from the winding spindle or the spindle bearings by suitably arranging the pair of feeding rollers 21 as well as the knife relative to the spindle 24, 30. After the required length of paper has been transported by the rollers or transporting means 21 to a cutting off position in which the front edge of the web is near the left end of the winding portion of spindle 24, the web is cut off by the knife 25 and the cut blank is moved in transversal direction toward the spindle, as indicated by arrows 20 in Fig. 1.

In the embodiment of the invention shown in the drawing, a cam operated transverse gripper or shifting means 33 is provided in front of the spindle bearing 26 for carrying out such transverse movement. While the previous tube is being wound, the blank 22 may be fed at least up to the end of the spindle 24 adjacent to the spindle bearings, or possibly even further. After the completed tube has been removed, the blank 22 is gripped by the transverse gripper 33 and inserted in transverse direction into the inserting slots 31, and then drawn forwardly in axial direction of the spindle into the winding position by the longitudinal gripper or feeding means 23. Thus, in this embodiment of the invention, the loss of time usually required for the blank to travel from the outermost spindle bearing 26 or the end of the spindle stud 30 to the beginning of the winding spindle is saved.

It often happens that the paper roll from which the web is drawn is badly wound up and parts thereof are shifted laterally thereon resulting in a similar uneven placement of the paper web as it is being fed to the machine. Such undesired lateral shifting of the web may also be adjusted by the transverse gripper 33, so that the paper edge is no longer inserted into the holding slot of the spindle unevenly or in an amount greater than necessary. For this purpose, as shown in Fig. 2, the gripper 33 is provided with an adjustable stop 34 which in the path of the gripper cooperates wth a stop 35 which is preferably adjustable during the operation of the machine by a hand wheel 36, or by hydraulic or electrical means, or, if desired, by automatically acting means, so that the amount of the transverse movement may be controlled in accordance with the respective requirements.

In the event that pneumatic means in the form of suction air are to be used for the transverse movement of the paper blank, an air slot may be provided on the winding spindle in place of the usual holding slot, and such air slot may be connected in any suitable manner with a source of suction air. In such event, the transverse movement of the cut-off paper blank can be carried out after it has been brought entirely within the reach of the spindle.

While in the foregoing description I have set forth in detail what I regard as the preferred embodiment of my invention, it is to be understood that numerous changes may be made without departing from the scope of the invention as defined in the appended claims.

Having thus described my invention, what I claim as new is:

1. In a machine for winding tubes consisting of sheets, in combination, a winding spindle including a winding portion having axially extending holding means; transporting means for transporting a web consisting of a sheet material in axial direction and in the plane of said winding spindle into a cutting off position located with said transporting means being spaced from said winding spindle in axial direction with respect to the same and being located transversely at one side of said winding spindle so that the web is transported radially spaced from said winding spindle with one longitudinal edge of the web adjacent to said spindle; cutting means extending transverse to the axis of said winding spindle spaced from the same in axial direction and adapted to cut off sheets in said plane from said web; shifting means movable in the direction transverse to the axis of said winding spindle and adapted to shift cut-off sheets from said cutting off position into and inserting position in which one longitudinal edge of each cut-off sheet is aligned with said holding means in axial direction while said sheets remain in said plane; and feeding means movable in axial direction between a first position located at one end of said holding means and a second position located at the other end of said holding means and adapted to insert into said holding means cut-off sheets shifted by said shifting means into said inserting position.

2. In the method of winding tubes on a rotary winding spindle including a winding portion having holding means extending in axial direction thereof, in combination, the steps of supplying, while said spindle is rotating substantially in the plane of the axis of said winding spindle and parallel therewith, one end portion of a web consisting of sheet material with its leading edge up to a point adjacent to that portion of said spindle on which a tube is being wound; successively cutting off in a direction transverse to the axis of said winding spindle sheets from said one end portion of said web; interrupting the rotation of said spindle; shifting each of said cut-off sheets in said plane and transversely to the axis of said winding spindle with one axially extending edge into said holding means; and shifting the thus transversely shifted cut-off sheet with its said axially extending edge within said holding means in axial direction of said winding spindle into said winding portion after the finished wound tube has been removed from said spindle.

3. In the method of winding tubes on a rotary winding spindle including a winding portion having holding means extending in axial direction thereof, in combination, the steps of supplying, while said spindle is rotating substantially in the plane of the axis of said winding spindle and parallel therewith, one end portion of a web consisting of sheet material with its leading edge up to a point adjacent to that portion of said spindle on which a tube is being wound, while one axially extending edge of said web is spaced in radial direction a short distance from said winding spindle; successively cutting off in a direction transverse to the axis of said winding spindle sheets from said one end portion of said web; interrupting the rotation of said spindle; shifting each of said cut-off sheets in said plane and transversely to the axis of said winding spindle with one axially extending edge into said holding means; and shifting the thus transversely shifted cut-off sheet with its said axially extending edge within said holding means in axial direction of said winding spindle into said winding portion after the finished wound tube has been removed from said spindle.

4. In the method of winding tubes on at least one rotary winding spindle including a winding portion having holding means extending in axial direction thereof, in combination, the steps of supplying, while said spindle is rotating substantially in the plane of the axis of said winding spindle and parallel therewith, one end portion of a web consisting of sheet material with its leading edge up to a point adjacent to that portion of said spindle on which a tube is being wound; successively cutting off in a direction transverse to the axis of said winding spindle sheets from said one end portion of said web; interrupting the rotation of said spindle; removing said wound tube from said spindle; shifting each of said cut-off sheets in axial direction of the spindle into a position in which one axially extending edge of said sheet is located opposite said holding means of said winding portion of said spindle; shifting said cut-off sheets in said plane and transversely to the axis of said winding spindle with said axially extending edge into said holding means.

5. In the method of winding tubes on at least one rotary winding spindle including a winding portion having holding means extending in axial direction thereof, in combination, the steps of supplying, while said spindle is rotating substantially in the plane of the axis of said winding spindle and parallel therewith, one end portion of a web consisting of sheet material with its leading edge up to a point adjacent to that portion of said spindle on which a tube is being wound, while one axially extending edge of said web is spaced in radial direction a short distance from said winding spindle; successively cutting off in a direction transverse to the axis of said winding spindle sheets from said one end portion of said web; interrupting the rotation of said spindle; removing said wound tube from said spindle; shifting each of said cut-off sheets in axial direction of the spindle into a position in which one axially extending edge of said sheet is located opposite said holding means of said winding portion of said spindle; shifting said cut-off sheets in said plane and transversely to the axis of said winding spindle with said axially extending edge into said holding means.

6. In a machine for winding tubes consisting of sheets, in combination, a winding spindle having a lateral slot axially extending along substantially its whole length, one portion of said slot being provided for receiving and the second portion provided for holding said sheets; bearing means supporting said first portion of said spindle and being provided with a slot adapted to be aligned with said lateral slot of said spindle in stopped position of said spindle; transporting means for transporting a web consisting of a sheet material in axial direction of said winding spindle, said transporting means being spaced from said winding spindle in axial direction with respect to the same and being located transversely at one side of said winding spindle so that the web is transported radially spaced from said winding spindle with one longitudinal edge of the web adjacent to said spindle; cutting means extending transverse to the axis of said winding spindle spaced from the same in axial direction and adapted to cut off sheets from said web; shifting means movable in the direction transverse to the axis of said winding spindle and in the plane of the axis thereof, and adapted to insert cut-off sheets into said receiving portion of said slots of said spindle and said bearing means; and feeding means movable in axial direction in said plane between a first position located at said receiving portion of said lateral slot of said spindle and a second position located at the holding portion of said lateral slot.

7. A machine for winding tubes as claimed in claim 6, and wherein said shifting means are provided with means for adjustably limiting the transverse movement thereof.

8. In a machine for winding tubes consisting of sheets, in combination, a winding spindle having axially extending holding means; transporting means for transporting a web consisting of a sheet material in axial direction of said winding spindle, said transporting means being spaced from said winding spindle in axial direction with respect to the same and being located transversely at one side of said winding spindle so that the web is transported radially spaced from said winding spindle with one longitudinal edge of the web adjacent to said spindle; cutting means extending transverse to the axis of said winding spindle spaced from the same in axial direction and adapted to cut off sheets from said web; feeding means movable in axial direction between a first position located at one end of said holding means and a second position located at the other end of said holding means for feeding the cut-off sheets in axial direction of said spindle and in a plane passing through the axis thereof; and shifting means movable in the direction transverse to the axis of said winding spindle and in said plane of the axis thereof, and adapted to insert cut-off sheets into said holding means.

References Cited in the file of this patent

FOREIGN PATENTS

| | | |
|---|---|---|
| 1,015 | Great Britain | of 1868 |
| 11,015 | France | Nov. 26, 1909 |
| 33,573 | Switzerland | June 3, 1905 |
| 209,889 | Germany | May 18, 1909 |
| 400,298 | France | July 22, 1909 |